Dec. 31, 1963 W. E. GELLNER 3,115,853
LIFTING AND TRANSPORTING MECHANISM FOR AGRICULTURAL IMPLEMENTS
Filed Nov. 15, 1961 5 Sheets-Sheet 1

INVENTOR.
WALTER E. GELLNER
BY
Merchant, Merchant
& Gould
ATTORNEYS

INVENTOR.
WALTER E. GELLNER
ATTORNEYS

Dec. 31, 1963 W. E. GELLNER 3,115,853
LIFTING AND TRANSPORTING MECHANISM FOR AGRICULTURAL IMPLEMENTS
Filed Nov. 15, 1961 5 Sheets-Sheet 5
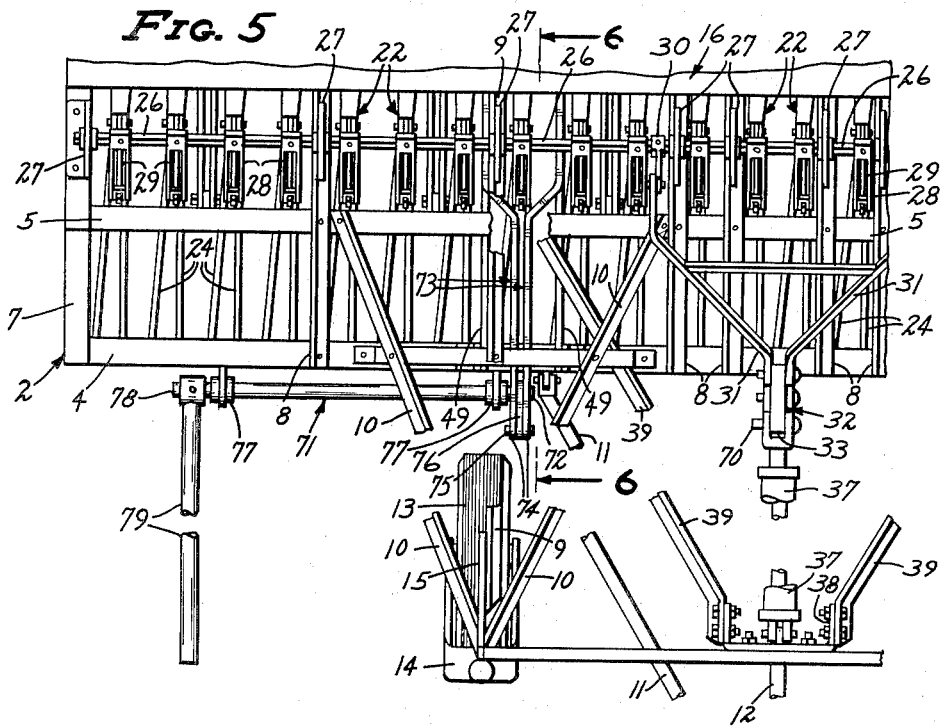
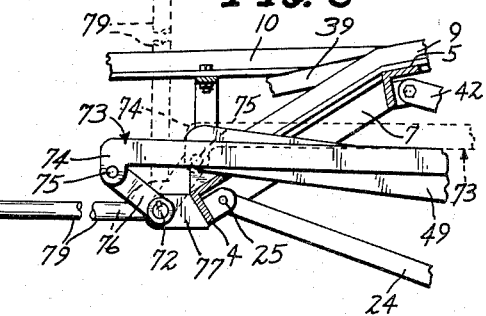
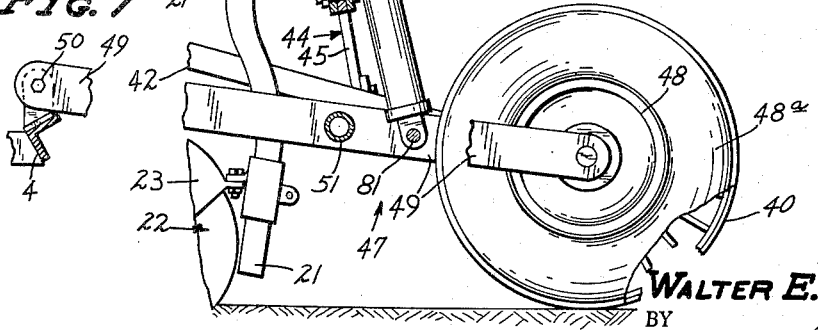
INVENTOR.
WALTER E. GELLNER
BY
Merchant, Merchant & Gould
ATTORNEYS

United States Patent Office 3,115,853
Patented Dec. 31, 1963

3,115,853
LIFTING AND TRANSPORTING MECHANISM
FOR AGRICULTURAL IMPLEMENTS
Walter E. Gellner, Langdon, N. Dak.
Filed Nov. 15, 1961, Ser. No. 152,597
6 Claims. (Cl. 111—54)

This invention relates generally to agricultural equipment and machinery, and more particularly it relates to a lifting and transporting mechanism for an agricultural planting drill.

More specifically, this invention relates to the provision of a lifting and transporting mechanism for an agricultural planting drill of the type having a plurality of seeding plates and a plurality of packing or covering wheels aligned with the seeding plates and disposed adjacent the rear of the implement, both the seeding plates and the packing wheels being spaced transversely to the normal direction of travel of the implement.

Agricultural planting drills of the class described above normally are equipped with caster wheels for supporting the forward portion of the implement, the above noted plurality of packing or covering wheels disposed adjacent the rear of the implement serving the dual function of supporting the rear portion of the implement and also covering the seed rows after the seed has been dispensed into the earth by the seeding plates of the implement. In a normal machine, mechanism is provided for raising and lowering the seeding plates, the same being raised when it is desired to transport the implement.

Obviously, agricultural planting drills of the class described above are heavy in construction, and the following objections, difficulties and disadvantages with respect thereto are apparent. Usually, when it is desired to transport an agricultural planting drill a relatively great distance, the time consuming and difficult job of loading and unloading the implement upon a truck or trailer must be carried out. Also, when a planting drill is transported on its own carriage, the plurality of packing wheels at the rear thereof must support a relatively large portion of the weight of the implement. This, of course, results in the undesirable and undue packing the earth when the implement is being transported in the field, and when the implement is being transported in such a manner, undue strain and wear upon the packing wheels obviously occurs. As compared with the above objects and disadvantages of the prior art, this invention has for its object to provide a lifting and transporting mechanism for an agricultural planting drill which is free from the above mentioned objections and difficulties.

Another object of this invention is the provision of a lifting and transporting mechanism for an agricultural planting drill in which a pair of supporting and packing wheels are substituted in the position of a widely-spaced previously removed pair of the packing wheels of the implement, said substitute wheels being provided with means for raising and lowering the same so that it is relatively easy to transport the implement, both in the field and upon the highway.

A still further object of this invention is the provision of a lifting and transporting mechanism for an agricultural planting drill which may be easily installed upon the implement without interferring with other operative functions of the device.

Other objects of this invention reside in the provision of a lifting and transporting mechanism for an agricultural planting drill which may be relatively economically manufactured, which is easy to mount and install on the implement, which is durable and strong in construction and which is highly efficient in providing satisfactory performance of its objects and purposes.

The foregoing and other objects and advantages of this invention will become apparent from the following detailed specification, appended claims and attached drawings.

Referring to the drawings, wherein like reference characters indicate like parts or elements throughout the several views:

FIG. 5 is an enlarged view in partial top plan showing an alternative embodiment of this invention;

FIG. 6 is an enlarged view in vertical section taken on the line 6—6 of FIG. 5, and showing by dotted lines an alternative position of some of the parts thereof; and FIG. 7 is a view in vertical section corresponding to a fragmentary rear portion of FIG. 3, but showing a further modified embodiment of this invention.

Figure 1:
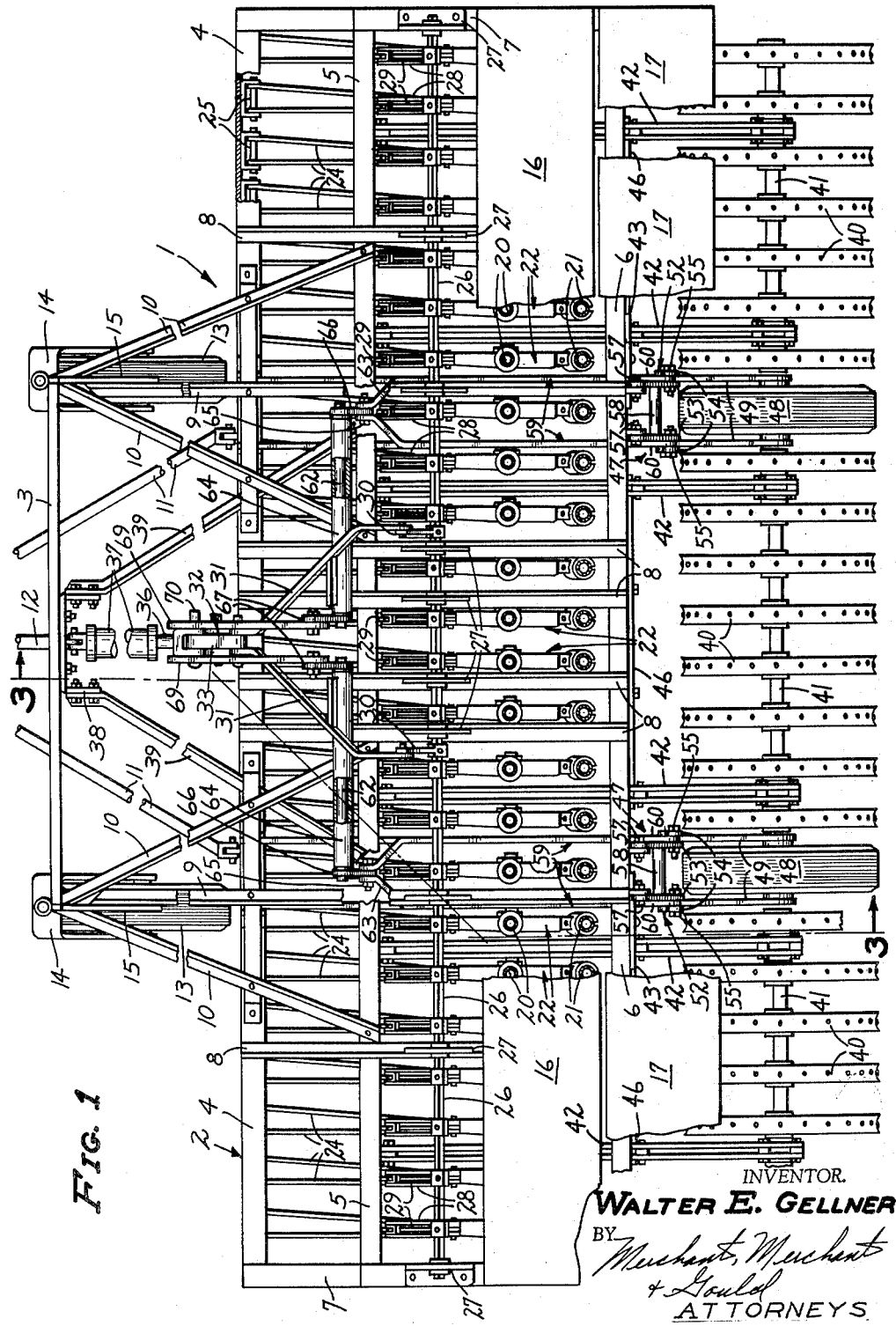
FIG. 1 is a view in top plan of this invention, some parts being broken away and some parts shown in section.

Referring to the drawings, and particularly FIG. 1 thereof, the reference numeral 1 represents the entire planting drill implement to which this invention is directed. The planting drill 1 comprises a rigid frame structure, represented generally by the reference numeral 2. The frame structure 2 includes an elongated transversely extending front channel bar 3, a front transversely extending angle bar 4, an intermediate transversely extending angle bar 5 and a rear transversely extending angle bar 6. The frame structure 2 further includes generally longitudinally extending end frame bars 7, intermediate frame bars 8, and relatively long forwardly projecting frame bars 9. Also, a pair of generally angularly disposed front brace bars 10 are secured adjacent the long longitudinal frame bars 9. A pair of angularly disposed tow bars 11 and a center tow bar 12 are pivotally secured to the frame structure 2 so as to provide means for conventional connection to a towing vehicle, not shown. The forward portion of the planting drill implement 1 is suitably supported by a pair of transversely spaced caster wheels 13. The caster wheels 13 are carried by conventional pivotally secured fork units 14, each of which is rigidly secured at one of the opposite ends of the front channel bar 3 of the frame structure 2. The securement of the fork units 14 to the frame structure 2 is further strengthened by the provision of generally rearwardly extending angle plates 15.

Figure 3:
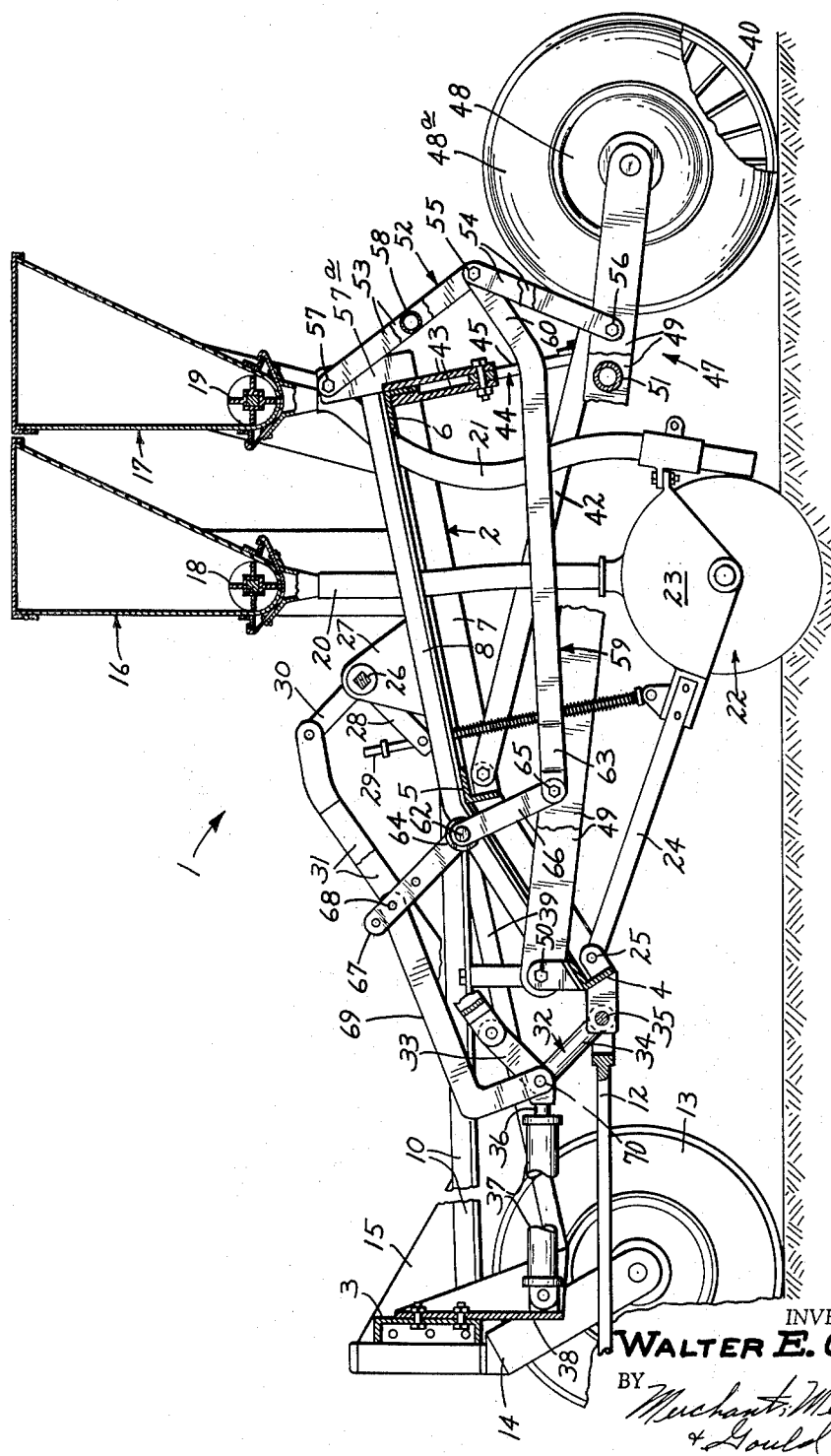
FIG. 3 is an enlarged view in vertical section taken on the line 3—3 of FIG. 1, some parts being broken away.
Figure 4:
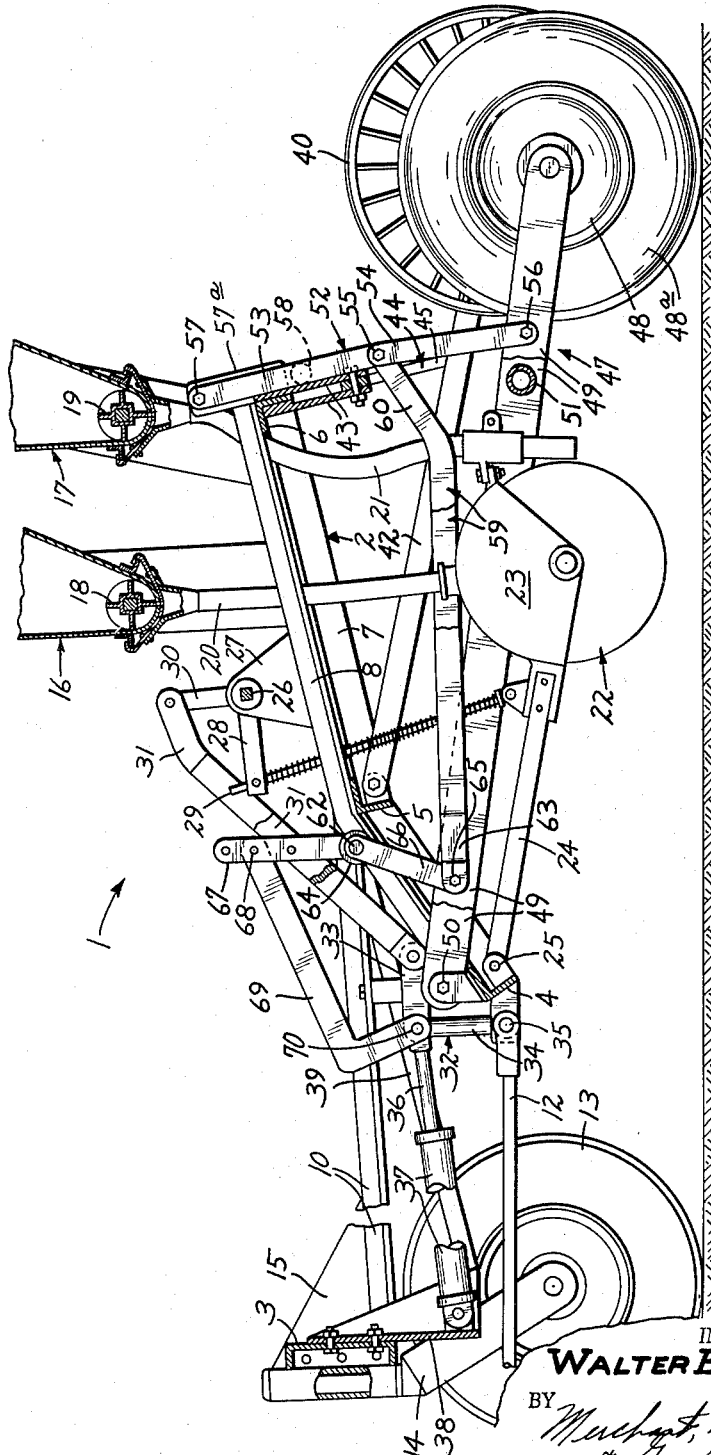
FIG. 4 is a view corresponding to FIG. 3, but showing an alternative position of some of the parts of this invention.

As shown particularly in FIGS. 1, 3 and 4, the planting drill 1 is equipped with conventional generally transversely extending hoppers 16, 17, which are rigidly secured to the implement 1 adjacent the rear thereof. The hoppers 16, 17 are provided at their bottom portions with elongated dispensing rotors 18, 19, respectively, for dispensing the seed or granular material contained therein into a plurality of generally transversely spaced delivery tubes 20, 21. One of the hoppers 16, 17 is adapted to carry the seed and dispense the same to a plurality of transversely spaced generally co-axial seeding plates 22, and the other of the hoppers 16, 17 is adapted to contain a fertilizer or herbicide material and dispense the same in the conventional manner. Each of the seeding plate assemblies 22 is mounted in a housing 23, the same being pivotally secured to the frame structure 2 of the implement 1 by means of a plurality of generally longitudinally extending mounting bars 24. The mounting bars 24 are arranged so that a pair thereof supports each of the seeding plate units 22, the mounting bars 24 being rigidly secured at their rearward ends to the housing 23 of the seeding plates 22 and also being pivotally secured, as at 25, to the front transverse angle bar 4 of the implement frame structure 2.

It will be noted that means is provided for raising and lowering the seeding plates 22 when it is desired to either lower the same into the ground for planting or raise the same when it is desired to transport the implement 1. Such means comprises an elongated generally transversely extending upper rock shaft 26 which is secured for rocking movements to the frame bars 7, 8 and 9 of the frame structure 2 by means of a plurality of upstanding brackets 27. A plurality of generally transversely spaced generally longitudinally extending crank arms 28 are rigidly secured to the upper rock shaft 26, one each thereof being in general alignment with a different one of the seeding plates 22. Each of the crank arms 28 is pivotally connected at its radially outer end to the upper end of an elongated shock absorbing rod 29, the lower end of which is pivotally secured to the housing 23 of the associated seeding plate 22, as shown particularrly in FIGS. 3 and 4. In order to impart pivotal rocking movements to the rock shaft 26 whereby to provide means for raising and lowering the seeding plates 22, a pair of upstanding crank arms 30 are rigidly secured in relatively closely axially spaced relationship on the upper rock shaft 26. The upstanding crank arms 30 are pivotally secured to the upper ends of a pair of fork links 31, the lower ends of which are pivotally secured to a bell crank 32. The bell crank 32 has an upper crank arm 33 which is pivotally secured at its radially outer end to the lower end of the fork links 31, and the bell crank 32 also has a lower crank arm 34 which is pivotally secured, as at 35, to the front transverse angle bar 4 of the frame structure 2. The bell crank 32 is also pivotally secured at its generally intermediate portion to the piston rod 36 of a fluid pressure cylinder 37. The fluid pressure cylinder 37 is pivotally secured to a depending bracket 38, the latter of which is rigidly carried by the implement frame structure 2 and provided with a pair of angle bracing bars 39 which extend rearwardly and are rigidly secured to the intermediate transverse angle bar 5 of the frame structure 2. See particularly FIGS. 1, 3 and 4. It will be appreciated by a comparison of FIGS. 3 and 4 that when it is desired to lift the seeding plates 22 from the ground, the fluid pressure cylinder 37 is actuated so as to push the piston rod 36 thereof in a generally rearward direction, whereby through the connection of the fork links 31 with the upper rock shaft 36, the shock absorbing rods 29 then lift the seeding plates 22. Conversely, it will be understood that when it is desired to lower the seeding plates 22 into the ground, the piston rod 36 of the fluid pressure cylinder 37 is actuated in a generally forward direction so as to impart a downward force to the shock absorbing rods 29 and thereby lower the seeding plates 22.

Figure 2:
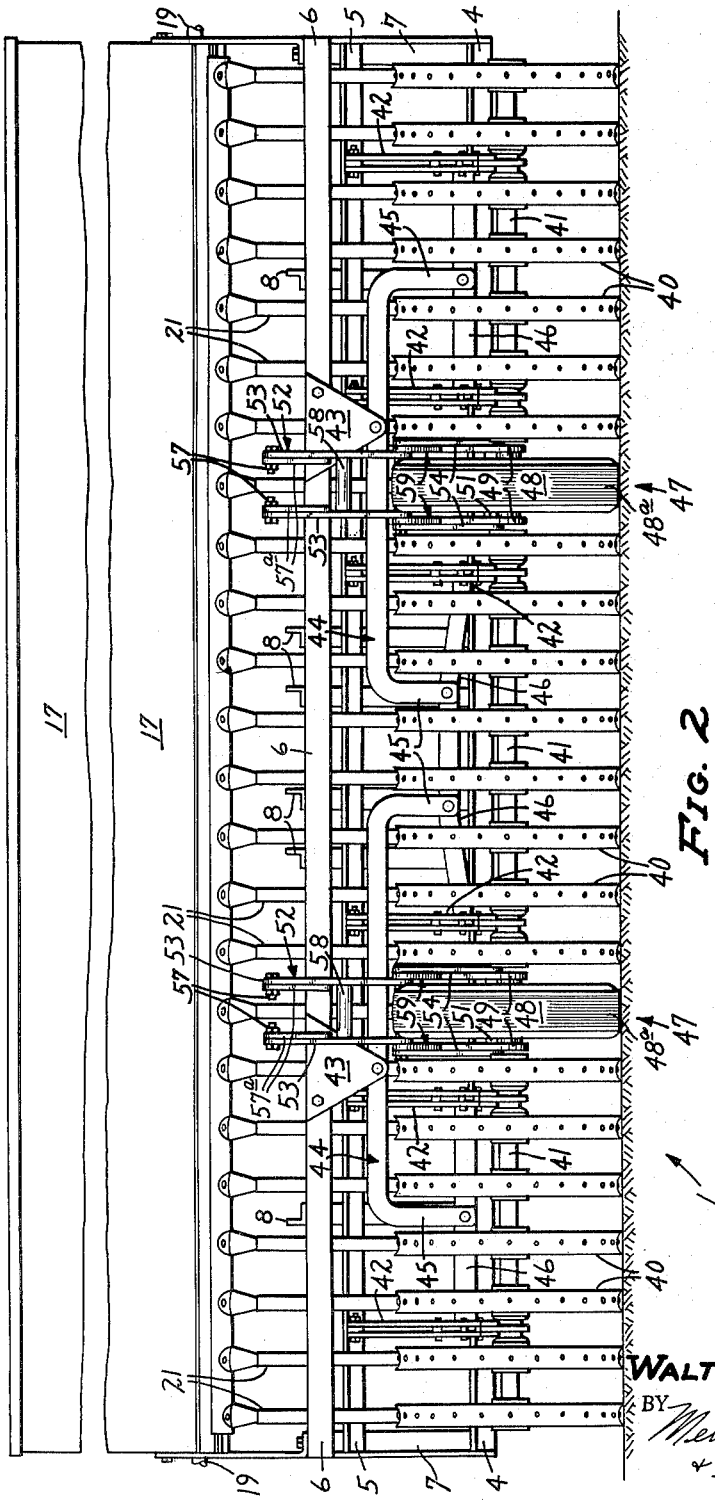
FIG. 2 is a view in rear elevation thereof, some parts being broken away.

In accordance with the construction of planting drill implements, a plurality of generally co-axial transversely spaced packing or covering wheels 40 are disposed adjacent the rear of the implement 1. The packing wheels 40 are provided for the purpose of covering the earth over the seeds after they have been planted in the ground by the seeding plates 22, and therfore each of the packing wheels 40 is disposed in generally longitudinal alignment with a given one of the seeding plates 22. The packing wheels 40 are mounted for rotation on generally co-axial axle sections 41, the same being mounted for limited pivotal movements with respect to the frame structure 2 by means of a plurality of generally longitudinally extending mounting shafts 42 pivotally secured at their rearward ends to the axle 41 and pivotally secured at their forward ends to the intermediate transverse angle bar 5 of the implement frame structure 2, as shown particularly in FIGS. 1, 3 and 4. The common axis of the packing wheels 40 is spaced rearwardly from and in general parallelism with the common axis of the seeding plates 22. Referring particularly to FIG. 2, the packing wheels 40 are also supported by means of a pair of transversely spaced depending back plate brackets 43 which are rigidly secured to the rear transverse angle bar 6 of the implement frame structure 2. A pair of bridle bars 44 are pivotally secured intermediate their opposite ends to the back plate bracket 43, the depending ends 45 of the bridle bars 44 being pivotally connected to tie bars 46, which are then pivotally connected to the mounting shafts 42. This construction provides limited relative movements between different sections of the packing wheels 40 so as to permit the same to effectively travel over uneven ground, and also provides relatively rigid support for the entire packing wheel assembly.

As previously noted, in the conventional construction of planting drill implements, the above described packing or covering wheels 40 are adapted to support the rear portion of the implement 1. In accordance with this invention, a lifting and transporting mechanism, represented generally by the reference numeral 47 is provided for connection to the planting drill implement 1. In order to permit mounting of a portion of this invention on the implement 1, a relatively widely-spaced pair of the packing wheels 40 are removed from the rear of the implement 1. Thereafter, and in accordance with this invention, a pair of generally co-axially disposed supporting and packing wheels 48 are one each substituted in the position of the relatively widely-spaced previously removed pair of the packing wheels 40. Each of the substitute wheels 48 is equipped with a rubber tire 48a, and is carried by a pair of elongated wheel carriage arms 49 the rear portions of which straddle said substitute wheels 48. The forward ends of the wheel carriage arms 49 are pivotally secured, as as 50, to the front transverse angle bar 4 of the implement frame structure 2. The wheel carriage arms 49 are maintained in their proper transversely spaced relationship with respect to the substitute wheels 48 by means of a spacer bar 51 rigidly interposed between each pair of the wheel carriage arms 49.

In order to provide means for raising and lowering the carriage arms 49, and thus the substitute wheels 48, apparatus, which is sometimes referred to herein generally as expansion means, is interposed between each pair of said wheel carriage arms 49 and the implement frame structure 2. In this first described embodiment of this invention, and as shown particularly in FIGS. 3 and 4, said expansion means comprises a pair of toggle joints, represented in general by the reference numeral 52, associated with each pair of the wheel carriage arms 49. Each of the toggle joints 52 includes upper and lower toggle links 53, 54, respectively, the same being pivotally joined at a common knee joint 55. The lower toggle links 54 of each of the toggle joints 52 is pivotally secured, as at 56, to the adjacent wheel carriage arm 49, and each of the upper toggle links 53 is pivotally secured, as at 57, a different one of a spaced pair of upstanding brackets 57a which are secured to the rear transverse angle bar 6 of the implement frame structure 2 in generally vertical alignment with the lower toggle link 54. The upper toggle links 53 of each associated pair of toggle joints 52 are rigidly secured together by means of a spacer bar 58. A generally horizontally disposed elongated connecting link 59 is associated with each of the toggle joints 52, the generally angularly upwardly formed rearward end portion 60 of each of the connecting links 59 being pivotally secured to the common knee joint 55 of the associated toggle joint 52.

Referring particularly to FIGS. 1, 3 and 4, a pair of elongated axially spaced rock shafts 62 are rotatably secured to the implement frame structure 2 above and adjacent the forward ends 63 of the connecting links 59, said rock shafts 62 being disposed in generally transversely extending relationship to the normal direction of travel of the planting drill 1. Both of the rock shafts 62 are rotatably disposed within tubular bearing pipes 64, the latter of which are rigidly secured to the intermediate longitudinally extending frame bars 8 and the angle bracing bars 39 of the implement frame structure 2. The forward end portions 63 of each associated pair of the elongated connecting links 59 are angularly inwardly formed, as shown particularly in FIG. 1 and pivotally secured, as at 65, to the radially outer end portion of a depending crank arm 66. The depending crank arms 66 are rigidly secured to the axially outer ends of the rock shafts 62, and a pair of generally upstanding crank arms 67 are rigidly secured to the axially inwardly disposed ends of the rock shafts 62. The generally radially outer end portions of the upstanding crank arms 67 are then adjustably secured, as at 68, to the generally rearwardly disposed end portions of an associated pair of generally transversely aligned angle links 69. The other end portions of the angle links 69 are pivotally secured as at 70, to opposite sides of the intermediate pivot portion of the previously described bell crank 32.

From the above description, it will be obvious that when the fluid pressure cylinder 37 is actuated between its above described positions for raising and lowering the seeding plates 22, the same will also comprise actuating means adapted when actuated in one direction to cause rotation of the rock shafts 62 so that the connecting links 59 apply a force to the toggle joints 52 which raises the substitute wheels 48 with respect to the implement frame structure 2, and when the piston rod 36 of the fluid pressure cylinder 37 is actuated in the opposite direction, the same will cause rotation of the rock shafts 62 in a direction opposite to the immediately above described rotation thereof so that said connecting links 59 apply a force to the toggle joints 52 which lowers the substitute wheels 48 with respect to the implement frame structure 2.

It should be understood that the above described lifting and transporting mechanism 47 provides means for raising and lowering the planting drill implement 1 with respect to the ground so that the same may be easily transported on the rubber tires of the substituted wheels 48. It is noted that the substitute wheels 48 are never raised above the remainder of the packing or covering wheels 40, so that the substitute wheels 48 serve a dual function of providing means for transporting the planting drill implement 1 and also serving the function of covering or packing the earth in the seed row of its aligned seeding plate 22, which last said function the substitute wheels 48 perform in a manner generally similar to the packing wheels which they replaced. It is emphasized that this dual function of the substituted wheels 48 is an important feature of this invention.

Referring to FIGS. 5 and 6, a modified embodiment of this invention is shown therein, the same comprising manual means for moving the apparatus between its different positions, which manual means is substituted for the fluid pressure cylinder 37 described above in the preferred form of this invention. It should be noted that the alternative embodiment of this invention shown in FIGS. 5 and 6 and hereinafter described corresponds in all respects not specifically hereinafter enumerated to the above described embodiment of my invention shown in FIGS. 1–4, and the parts or elements of said alternative embodiment which correspond to like parts or elements in FIGS. 1–4 are denoted by the use of the same reference characters. In this embodiment of this invention, a pair of elongated transversely extending shafts 71 are rotatably secured in front of the front transverse angle bar 4 of the implement frame structure 2. The shafts 71 are generally co-axially disposed and each one thereof is positioned with its inner end portion 72 disposed generally in front of a different pair of the carriage arms 49. With this embodiment, the rock shafts 62 of the first described embodiment are eliminated, and each pair of elongated connecting links 59 of said first described embodiment are replaced by longer more forwardly extending connecting links 73 in this embodiment of this invention. The generally parallel closely spaced forward end portions 74 of each pair of the connecting links 73 are pivotally secured, as at 75, to a crank arm 76 rigidly secured to said inner end portion 72 of each of the shafts 71. The shafts 71 are each mounted by means of a pair of axially spaced bearing units 77. The outer end portion 78 of each of the shafts 71 is provided with a rigidly secured elongated handle 79.

With this immediately above described alternative manual arrangement, the lifting and transporting mechanism 47 may be manually operated between its described respective positions by raising or lowering the handles 79, each handle 79 of course operating its respective side or one-half of said lifting and transporting mechanism 47. It is noted with respect to FIG. 6 that when the handles 79 are in the full line position thereof, the substitute wheels 48 will be in their upper positions, that is, a position in general axial alignment with the other packing wheels 40; and when the handles 79 are in the dotted line position of FIG. 6, the substitute wheels 48 will be in their lower position, that is, a position below the other packing wheels 40.

Still another embodiment of this invention is shown in FIG. 7, wherein said lifting and transporting mechanism 47 includes a pair of fluid pressure operated cylinders 80 each one of which is pivotally secured to a transverse bar 81 extending between each pair of the carriage arms 49. The piston rod 82 of each of said cylinders 80 is pivotally secured to a crossbar 83 extending between each associated pair of the brackets 57a. The cylinders 80 when actuated impart raising and lowering movements to the substitute wheels 48.

This invention has been thoroughly tested and found to be completely satisfactory for the accomplishment of the above objects and purposes; and while certain embodiments thereof have been shown and described above, it should be specifically understood that the same may be modified without departure from the scope and spirit of the appended claims.

What I claim is:

1. In a planting drill of the type having a rigid frame structure the front of which includes means for supporting the forward portion of the drill and which drill further includes a plurality of seeding elements, a plurality of generally coaxially disposed packing wheels mounted on said frame structure and one each disposed in general rearward alignment with a different one of the seeding elements, said packing wheels also being spaced generally transversely to the normal direction of travel of said drill, a pair of supporting and packing wheels substituted in the position of a widely spaced previously removed pair of packing wheels of the drill and their associated mounting means, means mounting said supporting and packing wheels for raising and lowering movements, and expansion means mounted in operative connection with said mounting means and said frame structure and adapted when actuated in one direction to raise said supporting and packing wheels with respect to the frame structure and with respect to said plurality of packing wheels and when said expansion means is actuated in the opposite direction the same lowering said supporting and packing wheels with respect to the frame structure and with respect to the packing wheels.

2. In a planting drill; a plurality of laterally spaced seeding elements; a pair of supporting and packing wheels each one of which is disposed in rearward alignment with one of a widely spaced pair of said seeding elements and one each disposed on a different side of the forwardly and rearwardly extending center line of said drill; a plurality of laterally spaced generally coaxial packing wheels each one disposed in general rearward alignment with a different one of the remainder of said seeding elements excepting said pair thereof; means mounting said spaced pair of supporting and packing wheels for raising and lowering movements independently of said packing wheels and between an upper position wherein the ground-engaging portions of said supporting and packing wheels are in general horizontal alignment with the ground-engaging portions of said packing wheels, whereby to cooperate with said packing wheels to compact the ground rearwardly of all of said seeding elements, and a lower position downwardly displaced therefrom, whereby to support said drill including said packing wheels in spaced relation to the ground; and actuating means for imparting movements to said supporting and packing wheels between their said upper and lower positions.

3. A lifting and transporting mechanism for an agricultural implement of the type having a rigid frame structure the front of which includes means for suitably supporting the forward portion of said implement, said mechanism comprising a plurality of generally co-axially disposed packing wheels mounted on said frame structure and spaced generally transversely to the normal direction of travel of said implement, a pair of supporting and packing wheels substituted in the position of a widely spaced previously removed pair of the packing wheels of the implement, a pair of elongated wheel carriage arms associated with each of said supporting and packing wheels, said carriage arms straddling said supporting and packing wheels at the rear portion of said arms and carrying said supporting and packing wheels, said carriage arms being pivotally secured at their forward end portions to said frame structure, a toggle joint having pivotally joined toggle links associated with each pair of said carriage arms, one of the toggle links of each of said toggle joints being pivotally secured to the associated wheel carriage arms and the other thereof being pivotally secured to the frame structure of said implement, a pair of elongated connecting links one each pivotally secured at its rearward end portion to the knee joint of a different one of said toggle joints, an elongated rockshaft rotatably secured to said frame structure adjacent the forward end portions of said connecting links in generally transversely extending relationship to the normal direction of travel of said implement, a pair of axially spaced crank arms rigidly secured to said rock shaft and one each pivotally secured at its radially outer end portion to the forward end portion of a different one of said connecting links, and actuating means carried by said frame structure and connected to said rock shaft and adapted when actuated in one direction to cause rotation of said rock shaft so that said connecting links apply a force to said toggle joints which raises said supporting and packing wheels with respect to said frame structure and said plurality of packing wheels and when actuated in the opposite direction cause rotation of said rock shaft in the opposite direction so that said connecting links apply a force to said toggle joints which lowers said supporting and packing wheels with respect to said frame structure and said plurality of packing wheels.

4. A lifting and transporting mechanism for an agricultural planting drill of the type having a rigid frame structure the front of which includes means for suitably supporting the forward portion of said implement, said mechanism comprising a plurality of generally co-axially disposed packing wheels mounted on said frame structure and spaced generally transversely to the normal direction of travel of the implement, a pair of supporting and packing wheels substituted in the position of a widely spaced previously removed pair of the packing wheels of said implement, a pair of elongated wheel carriage arms associated with each of said supporting and packing wheels, said carriage arms straddling said supporting and packing wheels at the rear portion of said arms and carrying said supporting and packing wheels, said carriage arms being pivotally secured at their forward end portions to said frame structure of said implement, a toggle joint having pivotally joined toggle links associated with each pair of said carriage arms, one of the toggle links of each of said toggle joints being pivotally secured to the associated wheel carriage arms and the other thereof being pivotally secured to the frame structure of said implement, a pair of elongated connecting links one each pivotally secured at its rearward end portion to the knee joint of a different one of said toggle joints, an elongated rock shaft rotatably secured to said frame structure adjacent the forward end portions of said connecting links in generally transversely extending relationship to the normal direction of travel of said implement, a pair of axially spaced crank arms rigidly secured to said rock shaft and one each pivotally secured at its radially outer end portion to the forward end portion of a different one of said connecting links, and actuating means carried by said frame structure and connected to said rock shaft and adapted when actuated in one direction to cause rotation of said rock shaft so that said connecting links apply a force to said toggle joints which raises said supporting and packing wheels with respect to said frame structure and said plurality of packing wheels and when actuated in the opposite direction causes rotation of said rock shaft in the opposite direction so that connecting links apply a force to said toggle joints which lowers said supporting and packing wheels with respect to said frame structure and said plurality of packing wheels.

5. A lifting and transporting mechanism for an agricultural planting drill of the type having rigid frame structure the front of which includes means for suitably supporting the forward portion of said implement, said mechanism comprising a plurality of generally co-axially disposed packing wheels mounted on said frame structure and spaced generally transversely to the normal direction of travel of the implement, a pair of supporting and packing wheels substituted in the position of a widely spaced previously removed pair of the packing wheels of said implement, a pair of elongated wheel carriage arms associated with each of said supporting and packing wheels, said carriage arms straddling said supporting and packing wheels at the rear portion of said arms and carrying said supporting and packing wheels, said carriage arms being pivotally secured at their forward end portions to said frame structure, a toggle joint having pivotally joined upper and lower toggle links associated with each pair of said carriage arms, said lower toggle link of each of said toggle joints being pivotally secured to the associated wheel carriage arms and said upper toggle link of each of said toggle joints being pivotally secured to the frame structure of said implement, a pair of generally horizontally disposed elongated connecting links one each pivotally secured at its rearward end portion to the knee joint of a different one of said toggle joints, an elongated rock shaft rotatably secured to said frame structure above the forward end portion of said connecting link in generally transversely extending relationship to the normal direction of travel of said implement, a pair of axially spaced radially depending crank arms rigidly secured to said rock shaft and one each pivotally secured at its radially outer end portion to the forward end portion of a different one of said connecting links, a generally upstanding crank arm rigidly secured to said rock shaft intermediate said radially depending crank arm, and actuating means carried by said frame structure and connected to said generally upstanding crank arm of said rock shaft and adapted when actuated in one direction to cause rotation of said rock shaft so that said connecting links apply a force to said toggle joints which raises said supporting and packing wheels with respect to said frame structure and said plurality of packing wheels and when actuated in the opposite direction causes rotation of said rock shaft in the opposite direction so that said connecting links apply a force to said toggle joints which lowers said supprting and packing wheels with respect to said frame structure and said plurality of packing wheels.

6. A lifting and transporting mechanism for a planting drill of the type having a rigid frame structure the front of which includes means for suitably supporting the forward portion of said drill and which drill further includes a plurality of seeding elements, said mechanism comprising a plurality of generally co-axially disposed packing wheels mounted on said frame structure and each disposed in general rearward alignment with a different one of the seeding elements, said packing wheels also being spaced generally transversely to the normal direction of travel of said drill, a pair of supporting and packing wheels substituted in the positions of a widely spaced previously removed pair of the packing wheels of the drill, a pair of elongated wheel carriage arms associated with each of said supporting and packing wheels, said carriage arms straddling said supporting and packing wheels at the rear portion of said arms and carrying said wheels, said carriage arms being pivotally secured at their forward end portions to said frame structure, and expansion means mounted in operative connection with said wheel carriage arms and said frame structure and adapted when actuated in one direction to apply a force to said wheel carriage arms so as to raise said supporting and packing wheels with respect to said frame structure and said plurality of packing wheels and when said expansion means is actuated in the opposite direction the same applying a force to said wheel carriage arms so as to lower said supporting and packing wheels with respect to said frame structure and said plurality of packing wheels, said expansion means comprising a fluid pressure operated cylinder.

References Cited in the file of this patent
UNITED STATES PATENTS

| | | |
|---|---|---|
| 713,818 | Tinsman | Nov. 18, 1902 |
| 2,195,631 | Post et al. | Apr. 2, 1940 |
| 2,588,918 | Graham | Mar. 11, 1952 |
| 2,679,793 | Rolf et al. | June 1, 1954 |
| 2,687,682 | Oehler et al. | Aug. 31, 1954 |
| 2,855,875 | Oehler et al. | Oct. 14, 1958 |

FOREIGN PATENTS

| | | |
|---|---|---|
| 906,280 | France | May 14, 1945 |